(12) United States Patent
Gao et al.

(10) Patent No.: US 6,885,737 B1
(45) Date of Patent: Apr. 26, 2005

(54) WEB INTEGRATED INTERACTIVE VOICE RESPONSE

(75) Inventors: Xiaofeng Gao, Alpharetta, GA (US); David Scott, Norcross, GA (US)

(73) Assignee: BellSouth Intellectual Propety Corporation, Wilmington, DE (US)

( * ) Notice: Subject to any disclaimer, the term of this patent is extended or adjusted under 35 U.S.C. 154(b) by 81 days.

(21) Appl. No.: 10/159,825

(22) Filed: May 30, 2002

(51) Int. Cl.[7] .......................................... H04M 11/00
(52) U.S. Cl. ............................. 379/93.17; 379/90.01; 379/88.17; 370/352
(58) Field of Search .......................... 379/93.17, 93.25, 379/90.01, 88.17, 265.09, 93.12, 88.13; 370/352

(56) References Cited

U.S. PATENT DOCUMENTS

| | | | | |
|---|---|---|---|---|
| 5,802,526 A | * | 9/1998 | Fawcett et al. | 379/88 |
| 5,912,952 A | * | 6/1999 | Brendzel | 379/93.17 |
| 6,091,805 A | * | 7/2000 | Watson | 379/93.17 |
| 6,385,646 B1 | * | 5/2002 | Brown et al. | 379/93.12 |
| 6,456,699 B1 | * | 9/2002 | Burg et al. | 379/88.13 |
| 6,493,428 B1 | * | 12/2002 | Hillier | 379/88.13 |
| 6,690,654 B1 | * | 2/2004 | Elliott et al. | 370/352 |
| 2003/0005076 A1 | * | 1/2003 | Koch et al. | 370/352 |
| 2003/0112931 A1 | * | 6/2003 | Brown et al. | 379/90.01 |
| 2003/0133548 A1 | * | 7/2003 | Lee et al. | 379/90.01 |
| 2003/0174814 A1 | * | 9/2003 | Diacakis | 379/80 |
| 2003/0179743 A1 | * | 9/2003 | Bosik et al. | 370/352 |

OTHER PUBLICATIONS

"Instant Messaging" notation made on Information Disclosure Statement submitted in conjunction with this document.

* cited by examiner

Primary Examiner—Stellla Woo
(74) Attorney, Agent, or Firm—Thomas, Kayden, Horstemeyer & Risley LLP

(57) ABSTRACT

Web integrated interactive voice response systems include a server adapted to check for accessibility of a network connection associated with a calling party, and a graphical user interface system adapted to provide a plurality of menus in a graphical format to the calling party over a network connection.

62 Claims, 6 Drawing Sheets

US 6,885,737 B1

WEB INTEGRATED INTERACTIVE VOICE RESPONSE

FIELD OF THE INVENTION

The present invention is generally related to telecommunications and more particularly to the integration of interactive voice response systems and web browsers.

DESCRIPTION OF THE RELATED ART

The telecommunications industry has undergone rapid changes in the past several years. With the development of the advanced intelligent network (AIN), telephone companies are poised to offer a multitude of new services to subscribers. One service that many telephone service providers now offer is a call center, which can be facilitated by the AIN. One example of an AIN is further described in U.S. Pat. No. 5,701,301 and U.S. Pat. No. 5,838,774, each of which is hereby incorporated by reference. The call center can typically comprise an interactive voice response (IVR) system that typically interacts with a calling party over the telephone network through dualtone multi-frequency (DTMF) of DTMF signaling in the public switched telephone network (PSTN).

IVR systems in particular have allowed telephone service providers to efficiently host call centers for business customers. An IVR system is typically used to dispense or collect information from callers, including pre-classifying calls, thus allowing service representatives to specialize in particular areas, cutting down on the need for live knowledgeable receptionists to receive calls and route them correctly. Alternatively, the entire call may take place over the IVR system, without the need for interaction with a service representative.

However, though these IVR systems may improve efficiency for the employees of the service provider, these systems are often the subject of much frustration with a calling party who may become stranded or confused in the IVR system. The user may not know how to return to the previous menu after choosing the wrong menu, or the user may not know how to replay a menu after missing a choice. Moreover, the voice menu may seem endless to the calling party because the calling party has no idea at what point he or she will reach a service representative or accomplish the intended objective.

Therefore, there is a need for systems and method that address these and/or other perceived shortcomings of the prior art.

SUMMARY OF THE INVENTION

One embodiment of the present invention provides systems and methods for web integrated interactive voice response. A representative system includes a web integrated interactive voice response system operable to receive an incoming call from a calling party, check an accessibility server for an internet connection associated with the calling party, send a voice prompt to the calling party, receive a response from the calling party and instruct a web server to send a web user interface based upon the response from the calling party.

A method to route phone calls includes: receiving a telephone call from a calling party; checking for an accessible network connection associated with the calling party; and prompting the calling party to choose between interacting via a graphical user interface format and interacting via a voice menu format.

A method for receiving phone calls is provided, whereby the method includes: dialing a phone number; using a computer with an accessible internet connection; receiving a voice prompt indicating the availability of a graphical user interface; receiving the graphical user interface format on the computer; and interacting with the graphical user interface.

Other systems, methods, features, and advantages of the present invention will be or become apparent to one with skill in the art upon examination of the following drawings and detailed description. It is intended that all such additional systems, methods, features, and advantages included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The invention now will be described more fully with reference to the accompanying drawings. The invention may, however, be embodied in many different forms and should not be construed as limited to the preferred embodiments and other embodiments set forth herein; rather, these embodiments are intended to convey the scope of the invention to those skilled in the art. Furthermore, all "examples" given herein are intended to be non-limiting.

Figure 1:
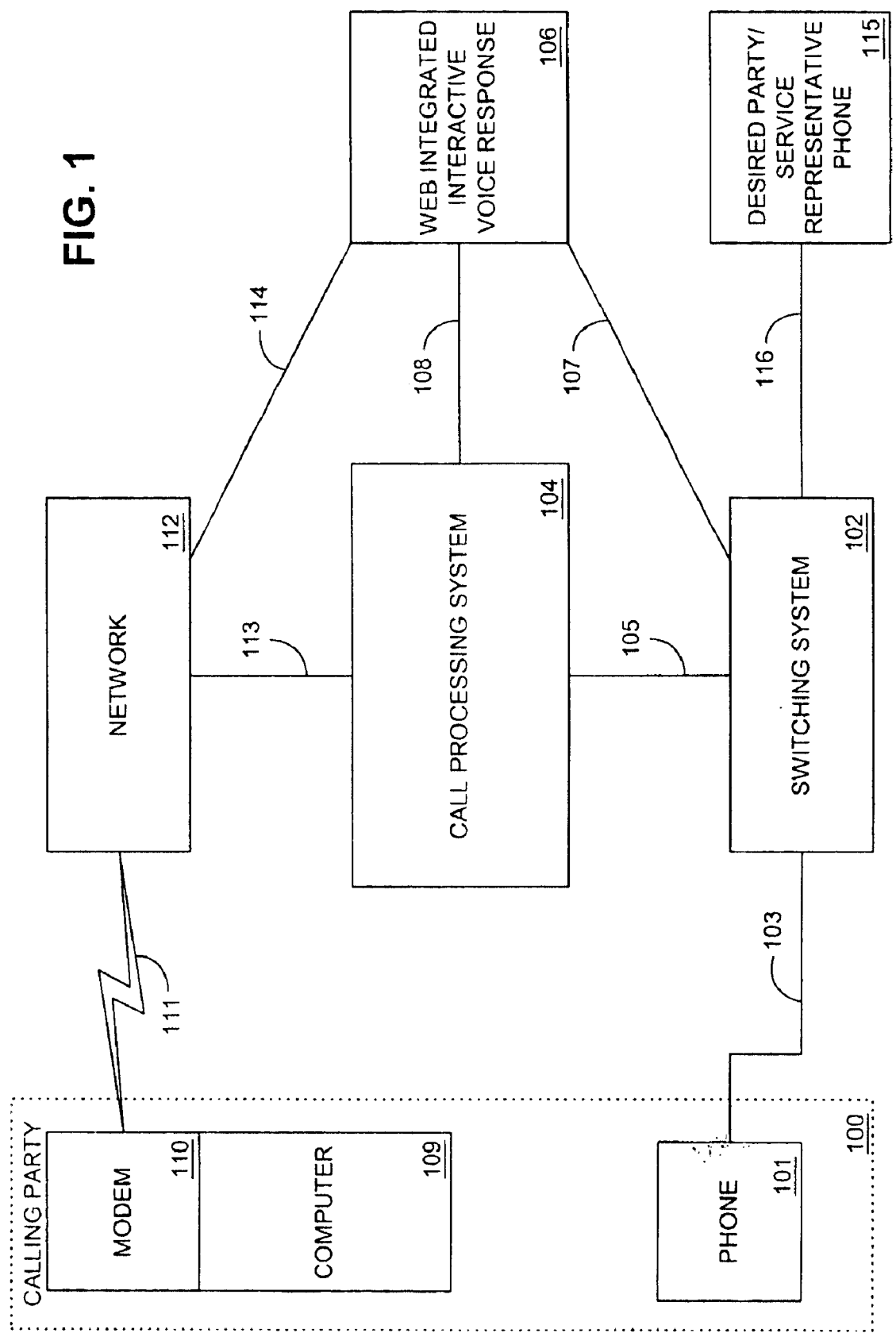
FIG. 1 is a block diagram illustrating a first preferred embodiment, among others, of the present invention.

Referring now to FIG. 1, shown is a block diagram of one preferred embodiment, among others, of the present invention. In this preferred embodiment a calling partly location 100 includes a standard plain-old telephone service (POTS) telephone 101 operating substantially within the POTS frequency range. The POTS frequency range is typically defined as the frequency range of 0 to 4 kilohertz (kHz), which contains substantially the range of frequencies which are audible to the human ear.

The telephone 101 is typically coupled to a switching system 102 through connection 103. The switching system 102 is operable to connect calls between system subscribers. In order to properly route calls, the switching system 102 is typically coupled to a call processing system 104 via connection 105. The call processing system 104 generally includes a customer database. The customer database can include subscriber specific handling information and call routing information. The routing information is used to connect the call to the proper party, while the subscriber specific handling information encompasses the individual services to which the calling or called parties subscribe.

In one preferred embodiment, among others, of the current invention, one of the services can include a call center provided by the telephone service provider. A call center typically includes an IVR which queries the caller, receives feedback, and routes the call to the appropriate service representative. In one preferred embodiment of the present invention, the IVR could be a web integrated IVR 106.

The web integrated IVR 106 can receive incoming calls via line 107 and provide an interactive voice response service to the calling party. The web integrated IVR can also send queries to the call processing system via line 108. When an incoming call is received, the web integrated IVR 106 can send a query to the call processing system 104 to determine whether or not the calling party 100 has a computer 109, shown having a modem 110, with an accessible connection 111 to the network 112. The network connection may include, alternatively, a standard modem, a cable modem, a digital subscriber line, an ethernet connection, or any other method which provides computer connectivity to a computer network.

The call processing system 104 is coupled to the network 112 via line 113, and can include a database comprising a list of users with accessible network connections. The call processing system 104 can compile this database through a registration application residing on the calling party computer 109 which sends a registration request through the network 112 to the call processing system 104, connected to the network via line 113. The registration application could be a custom application, or even an instant messaging client residing on the calling party computer 109, among others. Common instant messaging clients, among others, include: MSN Messenger, available from Microsoft, Corp. of Redmond, Wash.; Yahoo! Messenger, available from Yahoo!, Inc. of Sunnyvale, Calif.; AOL Instant Messenger, available from America Online, Inc. of Dulles, Va.; and Jabber Instant Messenger, available from Jabber, Inc. of Denver, Colo. One skilled in the art will further recognize that the Jabber Instant Messenger comprises an open systems architecture. Open systems architectures generally allow a user to manipulate the source program to tailor the client to specific needs of each individual user. Used in this context, the open system architecture could facilitate the development of a custom application to provide a registration with a central user database. In alternative embodiments, each of these alternative text communication applications, among others, are intended to be included within the scope of the present invention.

Alternatively, the call processing system 104 could receive the query from the web integrated IVR 106, and relay the query to the network 112. However, in order to do this the web integrated IVR 106 should have access to the applicable network database. Furthermore, the web integrated IVR 106 needs a way to map the calling party's telephone number (or other identification) to a network address. The network service provider providing network access to the calling party typically will include a database that dynamically assigns network addresses to its users as they log on and log off of the network 112. The network service provider will also include other databases, which can correlate a proper name or telephone number with a username, and ultimately to a network address if the user has a computer 109 connected to the network service provider. Thus, the call processing system 104 will be able to query the network 112 using the proper name of the calling party and receive a network address in response if the user is connected. One skilled in the art will recognize that the web integrated IVR 106 could alternatively send a query directly to the network 112 via line 114 to request information about a particular user's status.

When the web integrated IVR 106 receives a network address signifying that the calling party computer 109 has an accessible network connection, the web integrated IVR 106 can send a pre-recorded voice prompt to the calling party phone 101. The prompt can include a message indicating that there is an accessible network computer 109 and that the menu system is available in either voice menu format or a graphical user interface (GUI) format. Further, the GUI format can automatically be pushed to the computer 109 to facilitate user interaction with the web integrated IVR 106. The web integrated IVR 106 can then request that the calling party choose to continue with the voice menu format or transfer to the GUI format. If the party chooses the voice menu format, a series of pre-recorded voice menus are sent to the calling party telephone 101.

However, if the calling party chooses to receive the GUI format, the web integrated IVR 106 contacts a web server residing on the network 112. The web integrated IVR 106 notifies the web server that the calling party has requested the GUI format. The web integrated IVR 106 can supply the web server with the network address of the calling party computer 109, or alternatively, the web server itself can retrieve the network address of the calling party computer 109.

In alternative embodiments, the web server could "push" a web page to the calling party computer 109 or send a universal resource locator (URL) to the calling party computer 109. Pushing the web page to the calling party computer 109 can be performed by a "webcasting" application residing on the calling party computer, for example. "Push" technology is currently available in a number of forms including, but not limited to: Backweb, available from Backweb Technologies of San Jose, Calif.; Microsoft Internet Explorer, available from Microsoft Corporation of Redmond, Wash.; Netscape Netcaster, available from Netscape Communications Corporation of Mountain View, Calif.; Pointcast, available from Infogate, Inc. of San Diego, Calif. Pushing a URL to the calling party computer 109 can be accomplished using any of the "push" technologies listed above, but may alternatively be accomplished by merely sending the URL to the calling party computer 109 using any of the chat clients listed previously. The URL would provide the calling party computer 109 a link to the web server. Upon selecting the link, the calling party computer 109 would send a request to the web server, initiating a "pull" connection between the web server and the calling party computer 109. The web server would respond by returning a web page corresponding to the GUI format of the menu system.

In an alternative embodiment, among others, the web integrated IVR 106 can include a system to collect information from the user via the GUI format, and connect the calling party telephone 101 to the correct party. This is done by compiling a database according to the calling party's responses to a series of questions posed by the GUI and answers received by the web server. The web server, after collecting the information, could decide who the calling party should be connected to and notify the call processing system 104 to connect a call to the desired party or service representative 115 via a connection 116 through the switching system 102. Alternatively, the web server could notify the web integrated IVR 106 of the responses to the questions posed. The web integrated IVR 106 could then decide the correct disposal of the call and notify the call processing system 104. The call processing system 104 could then instruct the switching system 102 to perform the operation. Moreover, either the web server or the web integrated IVR 106 could be enabled to update a customer database on the call processing system, according to the answers received from the GUI format menu system.

In a second preferred embodiment, among others, of the current invention, one of the services of the call processing system 104 can include a web integrated IVR service. In this preferred embodiment, when a calling party places a call, the call request is received at the switching system 102. The switching system 102 queries the call processing system 104 for subscriber specific handling information. The call processing system 104 then queries a telephone service customer profile database to find the services to which the calling party or called party subscribe.

If the called party subscribes to the web integrated IVR service, the call processing system 104 database has a record that indicates that the called party is an IVR system. The call processing system 104 then checks its own database or, alternatively, a network database for accessibility of a network connection 111 associated with the calling party. If the call processing system 104 does not find an accessible network connection 111, the call processing system 104 instructs the switching system 102 to connect the call to the IVR system.

When the call processing system 104 finds an accessible network connection 111, the call processing system 104 preferably sends the calling party a prompt. This prompt can include information about the called IVR system and notification that there is a GUI format menu system corresponding to the called IVR. The call processing system 104 then asks the calling party whether he or she would like to use the GUI format instead of the voice menu format. If the calling party indicates that he or she would like to use the voice menu format, the call processing system 104 instructs the switching system 102 to connect the calling party telephone 101 to the called IVR system. However, if the calling party indicates that he or she would like to use the GUI format, the call processing system 104 instructs a web server to use "push" technologies to deliver a URL or a web page to the calling party computer, or merely send the URL to the calling party via a chat client, among other methods of initiating an interactive session with the calling party computer 109. After receiving the calling party's responses to the GUI, the call processing system 104 may optionally connect the calling party with the desired called party or service representative via a network phone or standard analog phone.

In an alternative embodiment, among others, after finding an accessible network connection 111, the call processing system 104 could pass the calling party computer network address to the called web integrated IVR 106 and establish a connection between the web integrated IVR 106 and the calling party telephone 101. The web integrated IVR 106 could then send a prompt to the user indicating the availability of a GUI format menu, and ask the caller to choose between the voice menu format or the GUI format. If the caller chooses the voice menu format, the standard interactive voice response system would be played. However, if the caller indicates a preference to use the GUI format, the web integrated IVR 106 sends the network address of the calling party's computer 109 to a web server, which contains a preferably similar menu system to that embodied in the voice menu system. The web server then initiates a session with the calling party by sending a URL or pushing a web page to the calling party computer 109, among others. In alternative embodiments, the calling party 100 may save the URL corresponding to the GUI format menu and use the URL at a later date. Further, after receiving the calling party's responses to the GUI format menu, the web integrated IVR 106 may optionally connect the calling party with the desired called party or service representative 115 via a network phone or standard analog phone.

In a third preferred embodiment, among others, of the present invention, the web integrated IVR 106 is enabled to query either the network 112 or the call processing system 104 to find the accessibility of a specific calling party network connection 111. In this preferred embodiment, when the switching system 102 receives a call request, and queries the call processing system 104, the calling party telephone 101 will be connected to the web integrated IVR 106. The web integrated IVR will then query a network database or a call processing database using the calling part name and/or telephone number to determine if the calling party has an accessible network connection 111 and determine the network address of the calling party computer 109. If the calling party has an accessible network connection 111, the web integrated IVR 106 will prompt the calling party. The prompt indicates the availability of a GUI format corresponding to the voice menu system, and asks the calling party whether they would like to use the GUI format. If the calling party answers in the negative, the web integrated IVR 106 will proceed in sending the standard voice menu format to the calling party telephone 101. However, if the calling party would like to use the GUI format, the web integrated IVR 106 will send the calling party computer 109 network address to a web server. The web server will initiate a session with the calling party computer 109 by sending a URL to the calling party computer 109, or by pushing a URL or web page to the calling party computer 109. After the calling party completes the interaction with the GUI format menu system, the web integrated IVR 106 may connect the calling party with the desired is called party or service representative 115 via network phone or standard analog phone, or update a customer database on the call processing system 104.

Figure 2:
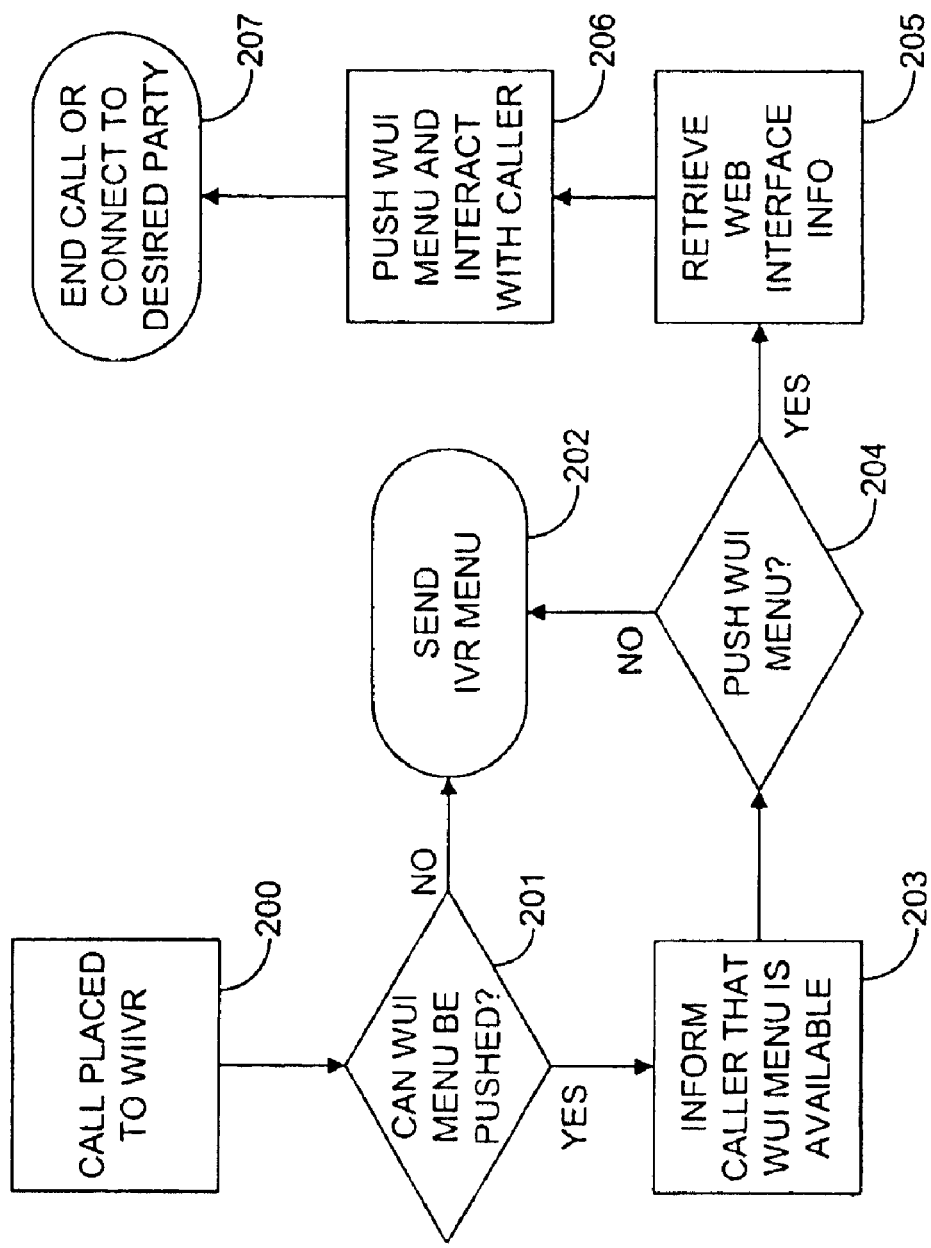
FIG. 2 is a flowchart showing the operation of the first preferred embodiment of the present invention, among others.

Referring now to FIG. 2, shown is a flowchart illustrating one preferred embodiment, among others, of a call flow using the system of FIG. 1. At step 200, a call is placed to the web integrated IVR by the calling party. As shown by step 201, the system then determines whether or not the GUI format menu can be pushed to a calling party computer. The GUI format menu can be pushed if a network connection is accessible at a computer associated with the calling party. The accessibility of the network connection can depend upon the presence of a connection and the availability of the calling party. If the network connection is not accessible, then the GUI format menu cannot be pushed, and as shown by step 202, the voice menu is sent to the calling party's telephone.

If a network connection is accessible, the GUI format menu can be pushed, and, as shown by step 203, the system informs the calling party of the availability of a GUI format menu. The system then asks the calling party whether or not he or she would like to use the GUI format menu system, as shown by step 204. If the calling party prefers not to use the GUI format menu system, as shown by step 202, the system sends the standard IVR menu to the calling party telephone.

If the calling party answers affirmatively to using the GUI format menu, the system can retrieve the web interface information, as shown by step 205. This information can include the network address of the calling party, a customized menu system for the specific calling party, and any other information that might be useful in facilitating interaction with the calling party. As shown by step 206, the system then pushes the GUI format menu to the calling party computer. GUI pages are typically customized, as is the IVR menu, to the needs of the calling party and to facilitate interaction between the calling party and the GUI format menu. An answer to the current GUI page can result in the next GUI page being sent to the calling party. However, the specific GUI page sent to the calling party depends upon the calling party's response on the current GUI page. Thus, there is true interaction between the calling party and the system. Moreover, the system records the calling party's responses to all previous GUI pages and uses these responses in updating customer databases or connecting a calling party to a desired called party or service representative, as shown by step 207.

Figure 3:
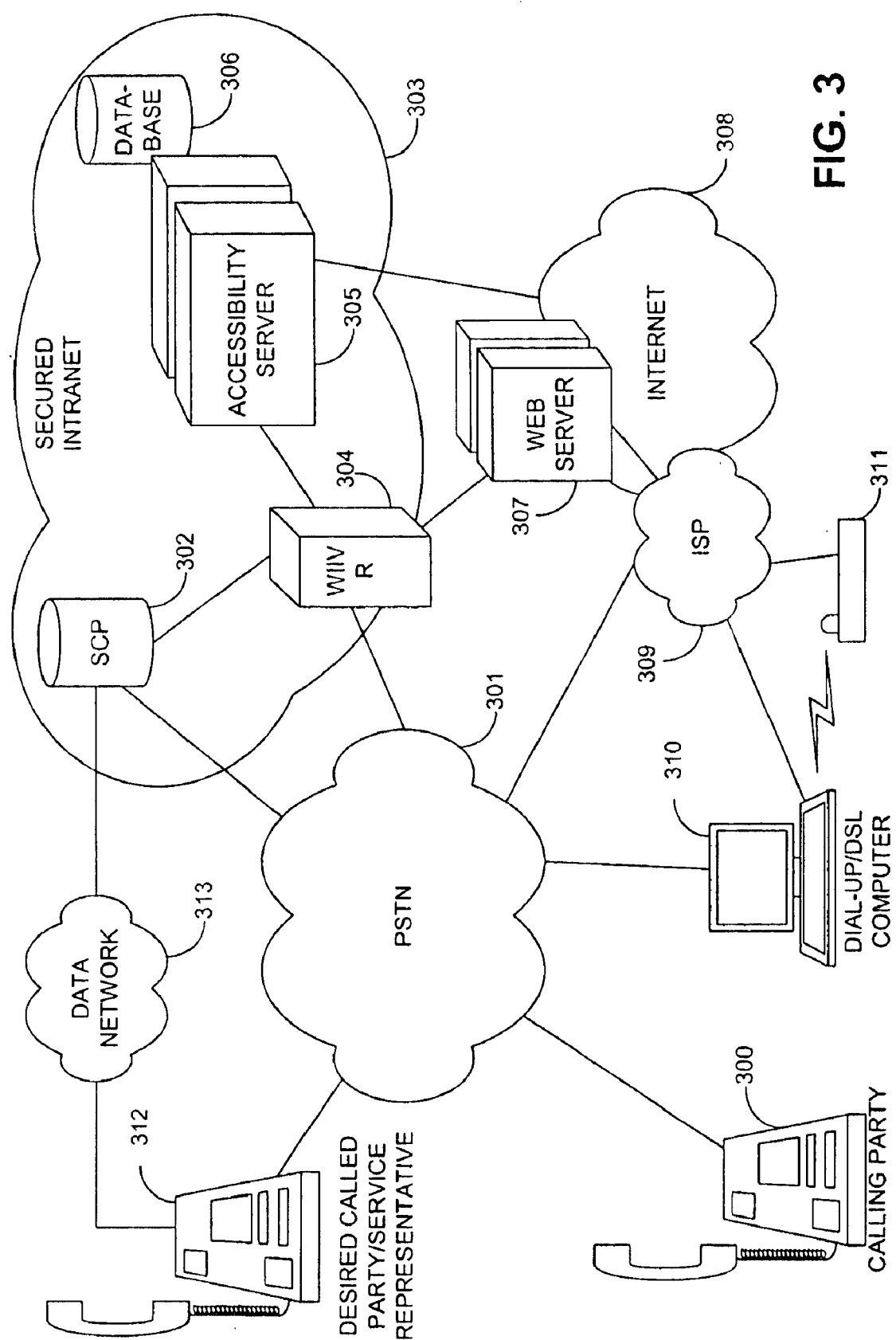
FIG. 3 is a schematic diagram illustrating one preferred embodiment, among others, of the present invention.

Referring now to FIG. 3, shown is a schematic diagram of one preferred embodiment, among others, of the present invention. A calling party telephone 300 is typically coupled to a public switched telephone network (PSTN) 301, which includes a plurality of service switching points (SSPs). The PSTN receives call handling information from a service control point (SCP) 302. The SCP 302 preferably resides on a secured intranet 303, which can also include an accessibility server 305, an accessibility database 306, and the web integrated IVR 304. In alternative embodiments, the web integrated IVR 304, accessibility server 305, and accessibility database 306 can exist on a separate intranet, among other possible arrangements. The web integrated IVR 304 is coupled to a web server 307, which can reside on the internet 308. The internet 308 further includes an overlaid internet service provider (ISP) 309. The ISP 309 includes a connection to a plurality of computers, and providing these computers with a connection to the internet 308. The computer 310 is intended to show a variety of methods by which the calling party can use a computer to connect to the internet 308, each of which, among others, can be used in conjunction with the present invention. The computer 310 first shows a standard dialup or DSL appliance. Here the computer 310 is shown connected to the ISP 309 through the PSTN 301. The second type of connection shows the computer 310 having a direct connection to the ISP 309, without the PSTN. With respect to the telephone service providers, this connection would typically represent a cable modem or ethernet. The final connection shown is a wireless system, whereby the computer 310 is connected via radio frequency to a base station 311. The base station 311 in turn can be connected to the ISP 309, as shown, or directly to the internet 308.

This embodiment illustrates a preferred embodiment, among others, of the present invention whereby the telephone service provider also acts as a call center for the desired called party. In this preferred embodiment the web integrated IVR 304 resides on the secured intranet 303. When the PSTN 301 receives a call to the desired called party, it queries the SCP 302 for subscriber specific handling instructions. The SCP 302 responds by instructing the PSTN 301 to connect the call to the web integrated IVR 304. The web integrated IVR 304 then sends a query to the accessibility server 305 to determine whether there is an accessible internet connection associated with the calling party, and the internet protocol (IP) address of the internet connection. There is an accessible internet connection when the calling party computer 310 has registered over the internet 308 with the accessibility server 305. The accessibility of an internet connection in one preferred embodiment depends upon the presence and availability of an internet connection. Presence typically relates to the presence of the computer being connected to the internet, while availability relates to the current availability or preference of the user. As one skilled in the art will recognize, these fields may be customized to provide alternative accessibility standards. If there is no accessible internet connection associated with the calling party, the web integrated IVR 304 sends the standard IVR menu to the calling party.

If there is an internet connection associated with the calling party, the web integrated IVR 304 sends a prompt to the calling party. The prompt includes informing the calling party that a web user interface (WUI) format menu is available, and asks if the calling party would like to use the (WUI) format menu. If the calling party does not choose to use the WUI format menu, the web integrated IVR 304 sends the standard IVR menu to the calling party telephone 300. If the calling party would like to use the WUI format menu, the web integrated IVR can retrieve the calling party computer 310 internet protocol address and send it to the web server 307.

The web server 307 can then initiate a session with the calling party computer 310. The session can be initiated by sending the calling party computer 310 a URL, inviting the calling party to select the URL to initiate the session. A chat client can be used by the web server and the calling party computer to facilitate the sending of the URL to the calling party computer 310. Alternatively, the session can be initiated by using push technology to "push" the URL or the first web page of the WUI to the calling party computer 310. Push technology, alternatively known as "webcasting," relies on an application residing on the subscriber's computer to initiate a push session whereby updates are requested by the application at regular intervals set by the user. As one skilled in the art will recognize, many push clients currently exist, and each of these push clients are intended to be included within the present invention.

Once a session has been initiated, the web server 307 will send a web page to the calling party computer 310. Each of the WUI format menu web pages sent to the calling party computer 310 can duplicate the voice menu voice prompts. Thus, each web page sent to the calling party computer 310 depends upon the calling party's answer to the previous question. Alternatively, the WUI format menu web pages can be different from the voice menu in order to take advantage of the graphical format of the web interface. Moreover, the WUI format menu can be customized for each particular user, depending upon the profile of that user.

The web integrated IVR 304 can receive the information from the web server 307, and after the WUI format menu has been completed, the web integrated IVR 304 can adjust customer profile databases accordingly. Alternatively, the web integrated IVR 304 could use the responses received from the calling party in order to instruct the SCP 302 to connect a call from the calling party telephone 300 to a desired called party or service representative telephone 312. The SCP 302 then instructs the PSTN 301 to connect a call between the parties. In one preferred embodiment, among others, the desired called party or service representative telephone 312 may include a connection to a data network 313. The data network 313 can be enabled to pass the information received from the web integrated IVR 304 to the service representative. This could enable the service representative to more efficiently deal with the calling party.

Figure 4:
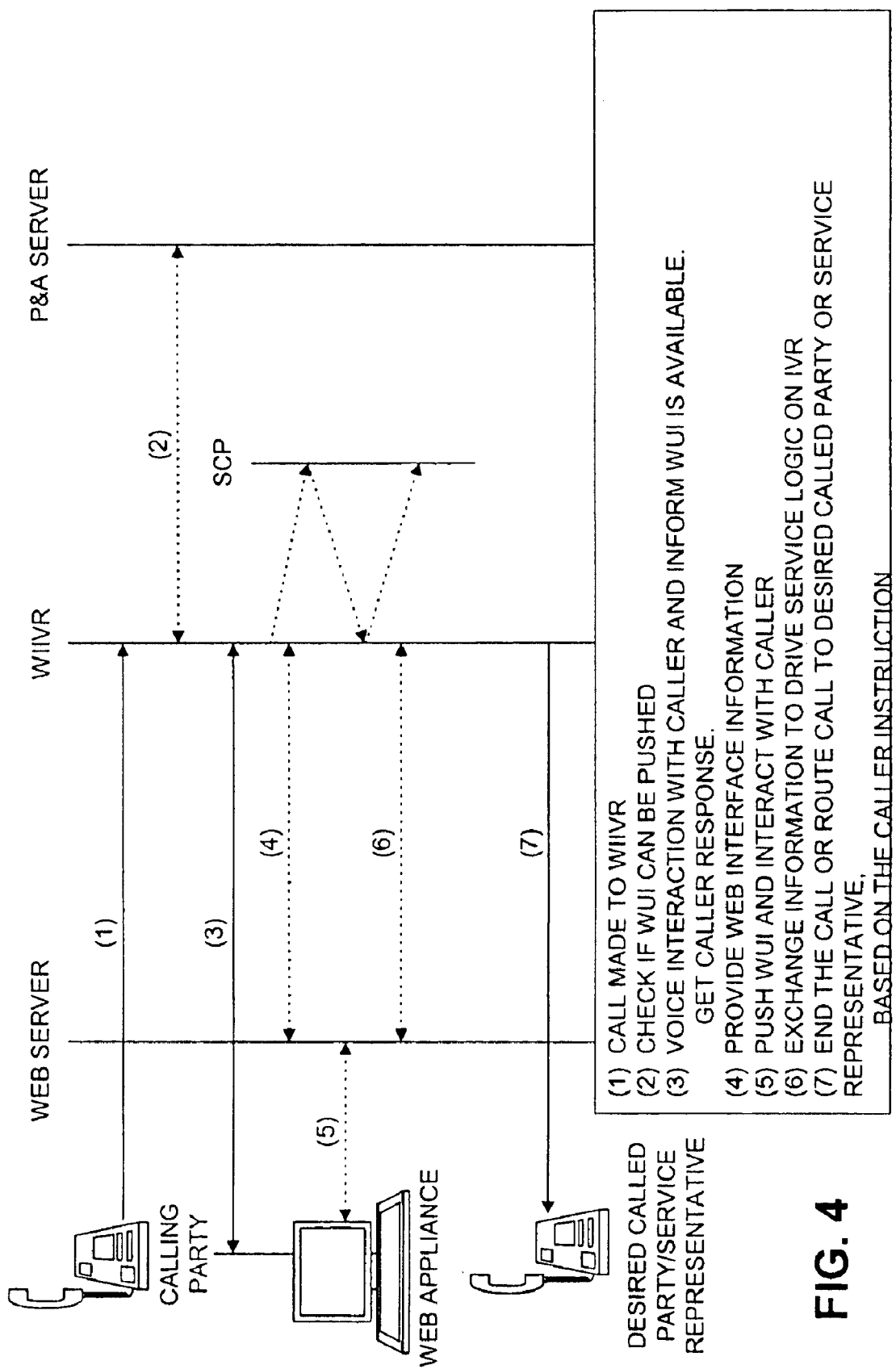
FIG. 4 is a call flow diagram detailing the operation of the preferred embodiment shown in FIG. 3.

Referring now to FIG. 4, shown is a call flow diagram detailing the operation of the system shown in FIG. 3. First a call is placed to the web integrated IVR 304 by the calling party. In this step, the calling party typically dials a telephone number corresponding to a telephone address of the web integrated IVR, thus making a call request. The SSP residing on the PSTN 301 receives the call request, and queries the SCP 302 for handling instructions. The SCP 302 responds with handling instructions and the SSP can connect the call to the web integrated IVR 304.

In the next step, the web integrated IVR 304 checks to determine if the WUI format menu can be pushed to the calling party. The WUI format menu can be pushed to the calling party only if there is an accessible internet connection associated with the calling party. An accessibility server 305 maintains database 306 including a list of all registered subscribers, such that the web integrated IVR 304 can query the server 305 in order to find the status of the calling party with respect to internet connectivity. The accessibility of an internet connection in this preferred embodiment is determined according to whether or not a computer 310 is present on the network 308, and whether or not a user is available at the computer 310. However, in alternative embodiments, the accessibility of an internet connection could be made contingent upon a number of other circumstances, including preference of the user.

The third step uses voice interaction to notify the calling party that a WUI format menu is available, and asks for the caller's preference on using the WUI format menu. Similar to a standard IVR system, the web integrated IVR 304 plays a pre-recorded message (understood to include other types of prompts as well) to the calling party. The pre-recorded message includes notification of the WUI format availability and asks the calling party if the WUI format menu is preferred. The web integrated IVR 304 then awaits the calling party response prior to performing the next step.

The fourth step involves requesting that the web server 307 establish a session with the calling party. To do this, the web integrated IVR 304 passes the web server 307 information about the calling party. The information passed can include the calling party computer's IP address, the calling party's name, and the calling party's customer profile.

Next, the web server 307 pushes the WUI format menu to the calling party computer 310 and interacts with the calling party. Push technology typically involves the use of an application running on the calling party's computer. It allows another computer to send information to the computer without the explicit request for the information. The information pushed to the calling party computer could include a URL or a web page. The WUI format includes of a series of menus, typically similar in substance to the IVR system menus.

After completing the interaction with the calling party computer 310, the next step involves the web server relaying the information compiled to the web integrated IVR. Finally, the call is ended, or the web integrated IVR 304 routes the call to the desired called party or service representative 312 based on the calling party's instructions. In order to route the call, the web integrated IVR 304 will typically notify the SCP 302 or an SSP that a call should be connected between the calling party and the desired called party or service representative 312.

In alternative embodiments, among others, the web integrated IVR 304, upon receiving updates from the calling party can adjust the customer profile as recorded at the SCP 302 according to the calling party's instructions. Furthermore, the web integrated IVR 304 may be enabled to exchange information regarding the calling party responses to the WUI format menu to the desired called party or service representative 312 upon connection. Thus, the desired called party or service representative 312 will be better able to efficiently assist a calling party with questions about service or other problems.

Figure 5:
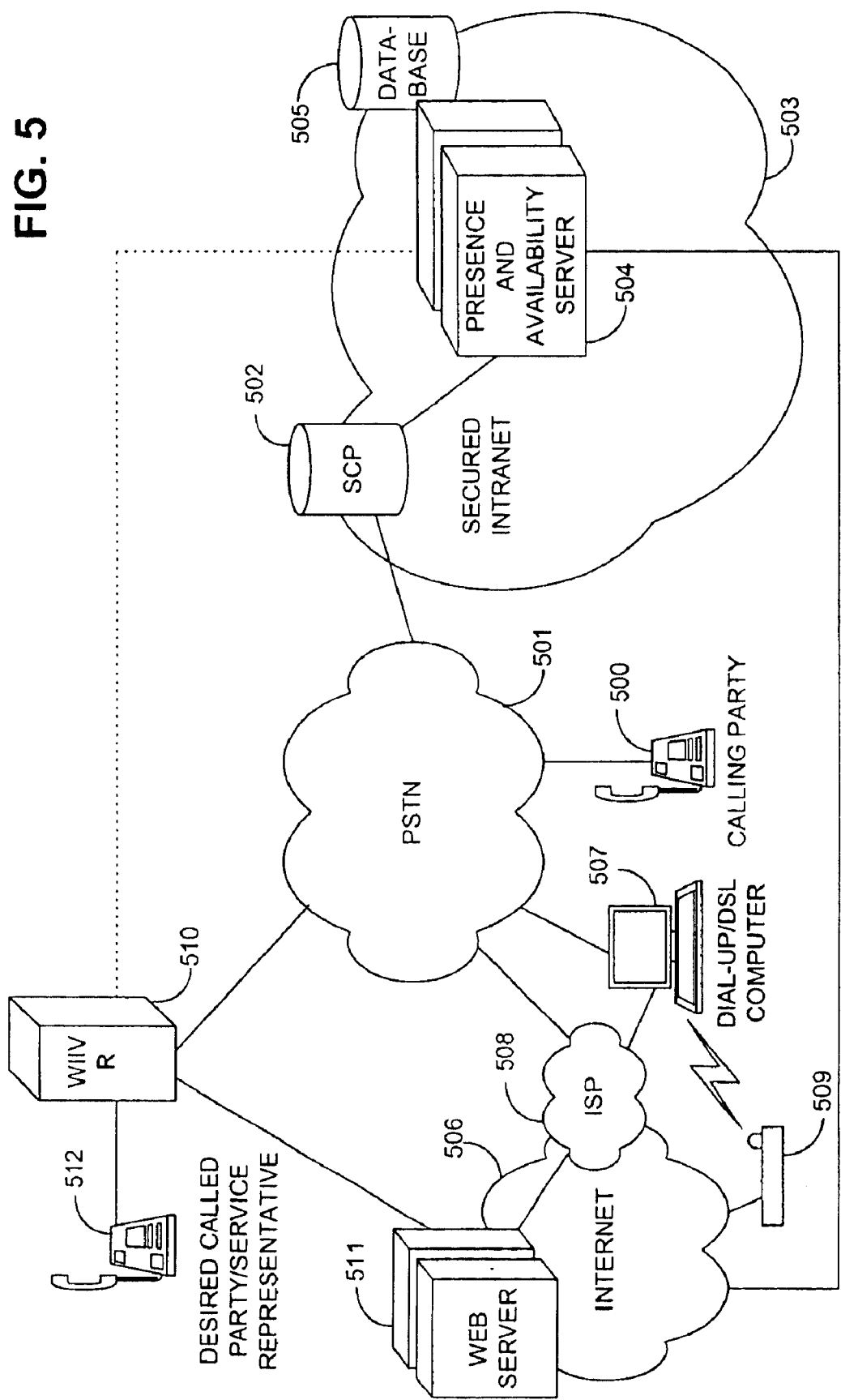
FIG. 5 is a schematic diagram illustrating a second preferred embodiment, among others, of the present invention.

Referring now to FIG. 5, shown is an alternative embodiment of the present invention. Again the calling party telephone 500 is coupled to the PSTN 501, which is coupled to the SCP 502, which resides on a secured intranet 503, and gives handling instructions to the PSTN 501. The secured intranet also includes an accessibility server 504 and an accessibility database 505. The accessibility server is coupled to the internet 506 and keeps track of the status of a plurality of subscribers' internet connections.

Typically, an internet connection can be established from a calling party computer 507 through an ISP 508 over the PSTN 501, such as by using a DSL modem or analog modem. However, an internet connection can be established in numerous ways, such a cable modem, wherein the computer 507 is connected directly to the ISP 508. Further, the computer 507 could be connected directly to the internet, or can go communicate via RF with a base station 509 which is connected to the internet. One skilled in the art will recognize numerous other ways to connect to the internet, each of which is intended to be within the scope of the present invention.

In this preferred embodiment of the invention, the PSTN 501 is coupled to a private branch exchange web integrated IVR 510 or a web integrated IVR 510 residing with another telephone service provider. The web integrated IVR 510 is coupled to a web server 511 to provide a WUI format menu to calling parties. The web integrated IVR 510 can be further coupled to the accessibility server 504 to retrieve accessibility information and to a desired called party or service representative 512 to ultimately connect the call according to the calling party's instructions. The system shown in FIG. 5 can use a call flow diagram substantially similar to the call flow diagram of FIG. 4 and can operate according to the call flow diagram shown in FIG. 6.

Figure 6:
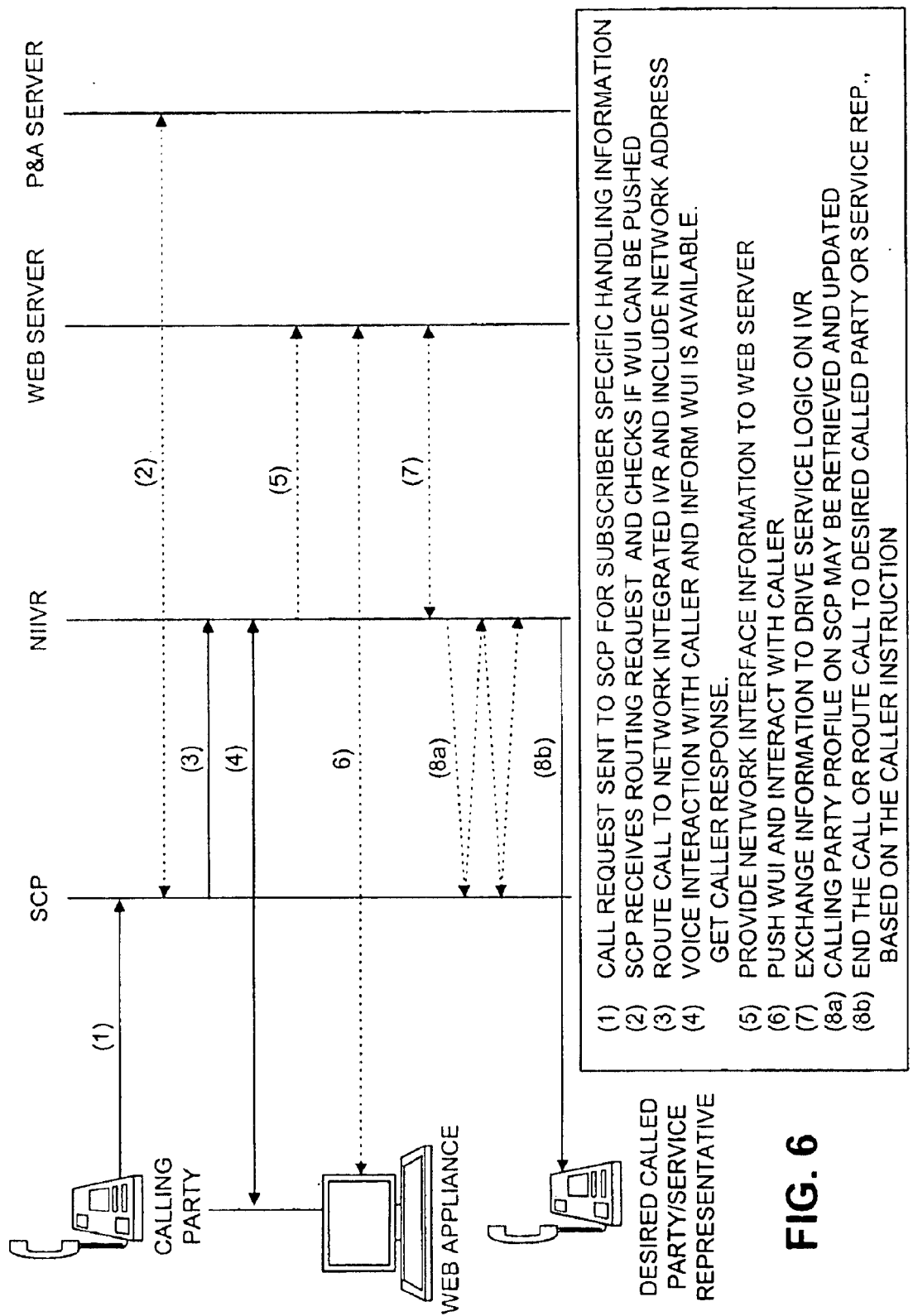
FIG. 6 is a call flow diagram detailing a preferred embodiment, among others, of the operation of the system of FIG. 5.

Referring now to FIG. 6, shown is one preferred embodiment, among others, of a call flow diagram illustrating the operation of the system, as shown in FIG. 5. First a call is made by the calling party to the web integrated IVR 510 system. Typically, the call request will be received at the PSTN 501, and the PSTN 501 will query the SCP 502 for handling instructions. The SCP 502 will check the telephone service customer database to find the handling instructions, and determine to which services the called party subscribes. These services can include an internet accessibility search to determine whether the calling party has an accessible internet connection.

Once it has been determined that that the calling party has an internet connection, the third step is to route the call to the web integrated IVR 510 along with the network address of the calling party. The SCP 502 can do this by instructing the PSTN 501 to connect the calling party call request to the web integrated IVR 510 and use a signaling network within the PSTN 501 to pass the calling party information to the web integrated IVR 510.

During the next step in the call flow diagram, the web integrated IVR 510 sends the calling party a pre-recorded message indicating that a WUI format menu is available and elicits a response from the calling party. The pre-recorded message can be a standard IVR message which asks the user whether the WUI format is preferred. The user typically responds by pressing a number indicating the user's preference. However, in alternative embodiments, the web integrated IVR 510 may be equipped with speech recognition software that can understand the user's spoken preference.

Provided that the calling party indicates a preference for the WUI format, the web integrated IVR 510 passes the calling party information to a web server 511. The web server 511 generally contains logic enabling the web server 511 to send web pages to a plurality of network users.

The web server 511 in the next step initiates a session with the calling party by sending a WUI format menu to the calling party computer 507 and interacting with the calling party. The session can be established by pushing a whole web page or merely a URL. The pushing is typically facilitated by a push application residing on the calling party computer 507, however, it can also be facilitated by a chat client residing on the calling party computer 507.

After interacting with the calling party, the web server 511 sends the information collected from the calling party during the session to the web integrated IVR 510. As one skilled in the art will recognize this step can occur during the web server interaction with the calling party. Moreover, the web server 511 may receive instructions from the web integrated IVR 510 to determine which web pages are sent to the calling party computer 507.

In the eighth step, the web integrated IVR 510 can update the calling party's profile on the SCP 502 according to the calling party's instructions. In addition the web integrated IVR 510 can end the call or route the call to the desired called party or service representative 512 based on the calling party's instructions. Moreover, as one skilled in the art will recognize, either or both of these functions can be performed at the end of the calling party's interaction with the web integrated IVR 510.

It should be emphasized that the above-described preferred embodiments of the present invention are merely possible examples of implementations set forth for a clear understanding of the principles of the invention. Many variations and modifications may be made to the above-described preferred embodiment(s) of the invention without departing substantially from the principles of the invention. All such modifications and variations are intended to be included herein within the scope of this disclosure and the present invention and protected by the following claims.

What is claimed is:

1. A web integrated interactive voice response system, comprising:
    an interactive voice response system adapted to provide a plurality of voice menus to a calling party over a telephone;
    a server adapted to check for accessibility of a network connection associated with the calling party;
    a graphical user interface system adapted to provide the plurality of menus in a graphical format to the calling party over a network connection; and
    the web integrated interactive voice response system being adapted to utilize the server to check the accessibility of the network connection with respect to the calling party, and being further adapted to instruct the interactive voice response system to send the voice menus to interact with the calling party when the network connection is inaccessible, to instruct the graphical user interface system to send the menus in the graphical format to interact with the calling party when the network connection is accessible, and to route a call to a called party, responsive to interaction with the calling party, through the graphical user interface system.

2. The system of claim 1, wherein the web integrated interactive voice response system is operable to send a prompt to the calling party before sending the menus in the graphical format.

3. The system of claim 1, wherein the web integrated interactive voice response system is operable to prompt the calling party to choose the graphical user interface system or the interactive voice response system.

4. The system of claim 1, wherein the graphical user interface system comprises a web server operable to receive instructions to send the graphical user interface when the internet connection is accessible.

5. The system of claim 4, wherein the web server uses a push client residing on a computer associated with the calling party to push the menus in the graphical format to the computer.

6. The system of claim 4, wherein the web server uses a chat client residing on a computer associated with the calling party to send a universal resource locator to the computer.

7. The system of claim 1, wherein the web integrated interactive voice response system resides on a proprietary telephone service provider network.

8. The system of claim 1, wherein the web integrated interactive voice response system resides on a private branch exchange.

9. The system of claim 1, wherein the accessibility of the network connection depends upon the presence and availability of a computer on the network.

10. The system of claim 1, wherein the network is the internet.

11. The system of claim 1, wherein the web integrated interactive voice response system is further adapted to update a customer profile database according to interaction with the calling party through the graphical user interface system.

12. A phone system comprising:
    a web integrated interactive voice response system operable to receive an incoming call from a calling party,
    the web integrated interactive voice response system being further operable to check an accessibility server for an internet connection associated with the calling party, and
    the web integrated interactive voice response system being further operable to send a voice prompt to the calling party, receive a response from the calling party and instruct a web server to send a web user interface based upon the response, and operable to route a call to a desired called party responsive to interaction with the calling party through the web server.

13. The phone system of claim 12, wherein the web integrated interactive voice response system is further operable to update a customer profile associated with the calling party based upon interaction with the calling party through the web server.

14. The phone system of claim 12, wherein the desired called party is a service representative.

15. The phone system of claim 12, wherein the web integrated interactive voice response system is located on a proprietary telephone service provider network.

16. The phone system of claim 12, wherein the web integrated interactive voice response system is located on a private branch exchange.

17. The phone system of claim 12, wherein the accessibility server stores and updates a list of users with available internet connections.

18. The phone system of claim 17, wherein the accessibility server stores and updates a list of users present at a computer with an available internet connection.

19. The phone system of claim 12, wherein the voice prompt indicates that a web user interface is available and asks if the user would like to use the web user interface to interact with the web integrated interactive voice response system.

20. The phone system of claim 19, wherein the response can be verbal, and the system further comprises voice recognition logic operable to recognize a verbal response.

21. The phone system of claim 19, wherein the response can be a DTMF, and the system further comprises a touch-tone recognition logic which recognizes the DTMF response.

22. A web integrated interactive voice response system, comprising:
   an interactive voice response system adapted to provide a plurality of voice menus to a calling party over a telephone;
   a graphical user interface system adapted to provide the plurality of menus in a graphical format to the user over a network connection; and
   the web integrated interactive voice response system being adapted to receive a signal indicating accessibility of a network connection associated with a calling party, and being further adapted to instruct the interactive voice response system to send the voice menus to interact with the calling party when the network connection is inaccessible, and to instruct the graphical user interface system to send the menu in the graphical format to interact with the calling party when the network connection is accessible, and is further operable to route a call to a called party responsive to interaction with the calling party through the graphical user interface system.

23. The system of claim 22, wherein the web integrated interactive voice signal receives an accessibility information signal from a signal control point through a signaling network on a public switched telephone network.

24. The system of claim 22, wherein the accessibility information signal includes the network address of a computer associated with the calling party.

25. The system of claim 22 wherein the web integrated interactive voice response system is further adapted to prompt the user to choose whether to use the voice menus or the graphical user interface system, prior to instructing the interactive voice response or the graphical user interface systems.

26. The system of claim 22, wherein the accessibility of the network connection depends upon presence of a computer associated with the calling party on the network.

27. The system of claim 26, wherein the accessibility of the network connection further depends upon whether the calling party is available at the computer.

28. The system of claim 22, wherein the graphical user interface system comprises a web server operable to receive instructions from the web integrated interactive voice system and to send the menus in the graphical format when the internet connection is available.

29. The system of claim 28, wherein the web server uses a push client residing on a computer associated with the calling party to push the menus in the graphical format to the computer.

30. The system of claim 28, wherein the web server uses a chat client residing on a computer associated with the calling party to send a universal resource locator to the computer.

31. The system of claim 22, wherein the web integrated interactive voice response system is further operable to update a customer profile associated with the calling party based upon interaction with the calling party through the graphical user interface system.

32. A method for routing a call, the method comprising:
   receiving a telephone call from a calling party;
   checking for an accessible network connection associated with the calling party;
   prompting the calling party to choose between interacting via a graphical user interface format and interacting via a voice menu format;
   sending a graphical user interface format over a network if both an accessible network connection is found and the calling, party chooses the graphical user interface format;
   sending a voice menu format otherwise; and
   routing a phone call to a called party responsive to instruction from the calling party through the graphical user interface.

33. The method of claim 32, further comprising:
   retrieving a network address corresponding to the accessible network connection.

34. The method of claim 32, further comprising:
   using a web server to send the graphical user interface over the accessible network connection.

35. The method of claim 34, further comprising:
   pushing the graphical user interface using a push client residing on a computer associated with the calling party.

36. The method of claim 34, further comprising:
   sending a universal resource locator to a chat client located on the calling party computer in order to send the graphical user interface.

37. The method of claim 32, further comprising:
   routing the call to a telephone service provider network call center.

38. The method of claim 32, further comprising:
   routing the call to a private branch exchange call center.

39. The method of claim 32, wherein checking for an accessible network connection associated with the calling party, comprises:
   querying a presence database to find if a computer associated with the calling party is registered on the network; and
   querying an availability database to find if the calling party is available at the computer present on the network.

40. The method of claim 32, wherein the network is the internet.

41. The method of claim 32, further comprising:
   updating a customer profile database based upon instruction from the calling party through the graphical user interface.

42. A method for routing a phone call, comprising:
   receiving a call from a calling party;
   checking an accessibility server for an internet connection associated with a calling party;
   sending a voice prompt to the calling party upon finding the internet connection;
   receiving a response from the calling party;
   instructing a web server to send a web user interface of a menu system over the internet to interact with the calling party based upon the response; and
   routing a call to a desired called party based upon interaction with the calling party through the web server.

43. The method of claim 42, further comprising:

updating a customer profile associated with the calling party based upon interaction with the calling party through the web server.

44. The method of claim 42, wherein the desired called party is a service representative.

45. The method of claim 42, further comprising:

routing the call to a telephone service provider network call center.

46. The method of claim 42, further comprising:

routing the call to a private branch exchange call center.

47. The method of claim 42, wherein checking an accessibility server for an internet connection associated with a calling party comprises:

querying a presence database to find if a computer associated with the calling party is registered on the network.

48. The method of claim 47, wherein checking an accessibility server for internet connection associated with a calling party further comprises:

querying an availability database to find if the calling party is available at the computer.

49. The method of claim 42, wherein the voice prompt indicates the availability of a web user interface and asks the user to choose the web user interface format or the voice menu format.

50. The method of claim 42, wherein the response comprises a verbal response.

51. The method of claim 42, wherein the response comprises a touchtone response.

52. A method for routing a phone call, comprising:

receiving a phone call from a calling party, including an information signal about a network connection associated with the calling party;

sending a graphical user interface format of a menu system over a network to interact with the calling party if the information includes a network address;

sending a voice menu format of a menu system over a phone network to interact with the calling party otherwise; and routing a call to a desired called party in response to interaction with the calling party through the graphical user interface.

53. The method of claim 52, further comprising:

receiving the information signal over a signaling network of a public switched telephone network.

54. The method of claim 52, wherein the information signal comprises the network address of a computer associated with the calling party.

55. The method of claim 52, further comprising:

prompting the user to choose to use the voice menu format or the graphical user interface format of the menu system; and sending the graphical user interface format based upon the choice of the calling party.

56. The method of claim 52, further comprising:

using a web server to send the graphical user interface format of the menu system to the calling party.

57. The method of claim 56, further comprising:

using a push client on a computer associated with the calling party to send the graphical user interface format of the menu system to the calling party.

58. The method of claim 52, further comprising:

using a chat client residing on a computer associated with the called party to send the graphical user interface format of the menu system to the calling party.

59. The method of claim 52, further comprising:

updating a customer database in response to interaction with the calling party through the graphical user interface format of the menu system.

60. A method for placing a phone call, comprising:

dialing a phone number;

using a computer with an accessible internet connection;

receiving a voice prompt indicating the availability of a graphical user interface;

receiving the graphical user interface on the computer;

interacting with the graphical user interface; and connecting to a desired called party based upon interaction with the graphical user interface.

61. The method of claim 60, further comprising:

being prompted to choose between the graphical user interface format and a voice menu system; and choosing to use the graphical user interface format prior to receiving the graphical user interface format on the computer.

62. The method of claim 60, further comprising:

updating a customer profile database base upon interaction with the graphical user interface.

* * * * *